United States Patent [19]
Price et al.

[11] Patent Number: 5,542,459
[45] Date of Patent: Aug. 6, 1996

[54] PROCESS AND APPARATUS FOR COMPLETE FAST FILLING WITH DEHYDRATED COMPRESSED NATURAL GAS

[75] Inventors: Billy F. Price; H. Joseph Thywissen, both of Houston; Nash Campisse, Pearland, all of Tex.

[73] Assignee: Price Compressor Company Inc., Houston, Tex.

[21] Appl. No.: 238,928

[22] Filed: May 6, 1994

Related U.S. Application Data

[63] Continuation-in-part of Ser. No. 94,495, Jul. 19, 1993, Pat. No. 5,370,159.
[51] Int. Cl.⁶ ............................. B65B 31/00; B67C 3/00
[52] U.S. Cl. ........................ 141/18; 141/47; 141/82; 62/50.2
[58] Field of Search ........................ 141/1, 2, 3, 4, 141/5, 18, 47, 49, 51, 82; 137/234.6; 417/244; 55/248; 123/525, 527; 62/50.2, 50.5

[56] References Cited

U.S. PATENT DOCUMENTS

| | | | |
|---|---|---|---|
| 1,339,431 | 5/1920 | Backhaus | 141/4 |
| 3,105,748 | 10/1963 | Stahl | 55/32 |
| 3,837,377 | 9/1974 | McJones | 141/7 |
| 4,153,083 | 4/1979 | Imler et al. | 141/4 |
| 4,527,600 | 7/1985 | Fisher et al. | 141/4 |
| 4,749,384 | 6/1988 | Nowobilski et al. | 55/27 |
| 4,805,674 | 2/1989 | Knowlton | 141/47 |
| 4,860,803 | 8/1989 | Wells | 141/9 |
| 4,966,206 | 10/1990 | Baumann et al. | 141/83 |
| 4,987,932 | 1/1991 | Pierson | 141/1 |
| 5,127,230 | 7/1992 | Neeser et al. | 62/7 |
| 5,370,159 | 12/1994 | Price | 141/4 |
| 5,385,176 | 1/1995 | Price | 141/4 |
| 5,409,046 | 4/1995 | Swenson et al. | 141/18 |

FOREIGN PATENT DOCUMENTS 1130715  12/1984  U.S.S.R. ..................... 141/4

OTHER PUBLICATIONS

Public Service Company of Colorado, Team NGV Natural Gas Vehicle Pamphlet, date unknown.
Brochure of CNG Equipco, date unknown.
*Industry News* "Natural Gas Fuels", Jan. 1993, pp. 6, 7 and 9.
*Industry News* "Natural Gas Fuels", vol. 1, Iss. 1, Aug. 1992, pp. 6–9.
Tri–Fuels Incorporated, Catalog at pp. 26, 52 and 53, date unknown.
Brochure of Natural Gas Resources, Inc., date unknown.
Brochure of Tri–Fuels Incorporated, date unknown.
Arthur Unknown, Title of Book Unknown, pp. 526, 528–531, Publisher Unknown, Date Unknown.

*Primary Examiner*—Henry J. Recla
*Assistant Examiner*—Steven O. Douglas
*Attorney, Agent, or Firm*—Pravel, Hewitt, Kimball & Krieger

[57] ABSTRACT

Methods and apparatus for completely filling a fuel receiving tank with compressed natural gas under fast-fill conditions are provided. To achieve this, the methods and apparatus provide for supplying cool compressed natural gas to a fuel tank and methods and apparatus for drying the compressed natural gas to prevent the risk of water condensation, corrosion and icing up of equipment. Further, the delivery of dried compressed natural gas to the receiving fuel tank is carried out under conditions that expand the gas into the receiving tank thereby enabling complete filling of the tank. In another aspect, the methods and apparatus utilize a second independent compressor of lower horsepower, or an evacuator cylinder of a primary compressor, for circulating and cooling compressed natural gas into the storage tank.

25 Claims, 4 Drawing Sheets

PROCESS AND APPARATUS FOR COMPLETE FAST FILLING WITH DEHYDRATED COMPRESSED NATURAL GAS

RELATED APPLICATIONS

This application is a continuation-in-part of U.S. Ser. No. 08/094,495, now U.S. Pat. No. 5,370,159, filed Jul. 19, 1993.

BACKGROUND OF THE INVENTION

1. Field of the Invention

The invention relates to supply of dry compressed natural gas into fuel tanks. More specifically, the invention provides an apparatus and process that allows complete fast filling of a fuel tank with dry compressed natural gas.

2. Description of the Related Art

The Department of Energy has launched a nationwide program to put 250,000 alternative-fueled vehicles (AFV's) on the road, along with 500 to 1,000 fueling stations in cities of the United States. This new program, known as the "Clean Cities Program", follows on the heels of the recent passage of the Energy Policy Act of 1992 and recommendations of a Federal Fleet Conversion Task Force, established to examine how AFVs can be phased in within the next several years. *Natural Gas Fuels*, November 1993, p. 9.

While growing concern about the environment, and more specifically about the quality of air, is spurring an interest in the use of compressed natural gas (CNG) as a vehicular fuel, this technology presents several challenges. One of these is the capability to deliver CNG rapidly to the fuel tanks of a user (such as a natural gas vehicle (NGV), from the supply tank of a CNG supplier). According to a recent article, "One of the problems affecting the acceptance of NGV's using fast-fill CNG fueling is the inability to attain a complete tankful. William T. Latto, "Why Can't I Get Full Range When I Fast-Fill My NGV?", *Natural Gas Fuels*, December 1993, pp. 28–29. The article continues, explaining that, "One of the primary reasons for incomplete fast-fill is the compression heating of the gas in the fuel tank during the fill process." Thus, when natural gas is compressed into a fuel tank, the gas heats up and expands. This effect is particularly acute in warm climates where heat is not readily dissipated from the fuel tank. As a result of the gas expansion, the tank is not quite completely filled. Upon cooling, there is up to about a 25% pressure decrease in the tank as a result of the contraction of cooling gas. Because fuel tanks cannot be completely filled with present fast-fill methods for CNG, the full traveling range of an NGV cannot be realized.

FIG. 1 of the *Natural Gas Fuels* article illustrates the shortcomings of present CNG fast-fill methods and how an NGV fuel tank cannot be completely filled using the fast-fill methods. As the pressure in the NGV fuel tank increases (as CNG is delivered to the fuel tank) the temperature of the fuel tank also increases. This causes expansion of the gas. When the tank is "full" at a pressure of about 3,000 psi, delivery of CNG into the tank is terminated. However, upon cooling, pressure in the tank decreases and the pressure loss may be as high as 25%. On the other hand, when a time-fill procedure is used, the tank is pressurized much more slowly requiring a very much longer filling time. While this potentially allows complete filling of the fuel tank, the length of time required is inconvenient for a consumer. Thus, while fast-fill procedures solve the fueling time problem by allowing fueling of the tanks in a short time, the fast-fill systems do not allow complete filling of the NGV fuel tank.

According to the *Natural Gas Fuels* article, one of the presently proposed solutions to solving the "pressure loss problem" is to overpressure the fuel tank during the fast-fill procedure. However, overpressuring a tank poses certain safety hazards and is probably not advisable. Another proposed solution is to cool the incoming gas with a refrigeration system to offset compression heating. This is an expensive proposal and no details of the proposed refrigeration system are supplied. But, it is suggested that a cost analysis is needed to assess the impact of a refrigeration system and high pressure heat exchanger on the cost of providing CNG fast-fill fueling. Another proposed solution is to vaporize liquified natural gas (LNG) with a cold inlet temperature into the fuel tank to offset compression heating. Finally, it is suggested that a heat exchanger should be placed inside the fuel tank to remove heat during the filling operation. This solution appears to be unpractical because a permanent heat exchanger will add weight to the fuel tank and decrease its potential storage space. It is also not practical to have a removable heat exchanger placed inside a high pressure fuel tank.

Aside from these fuel rate and energy conservation aspects, there is a significant corrosion problem. Corrosion fatigue is caused by a combination of corrosive agents found in natural gas—hydrogen sulfide, carbon dioxide, water (or water vapor)—which, together with the pressure cycling associated with the use of CNG equipment, results in the development of stress and corrosion cracks in the equipment. In order to limit these corrosive effects, standards have been proposed for upper limits of water content in CNG for use as a vehicular fuel. These are currently listed as the "draft proposed revisions to SAE J1616," listing upper limits of residual water content in vehicular fuel in 22 urban areas. Of these, the lowest limit is at 5,000 psig set for Milwaukee (0.45 lb/MMSCF), and the highest for Los Angeles and San Diego (3.0 lb/MMSCF); at 3,000 psig, the lowest is 0.5 lb/MMSCF for Milwaukee and the highest is 3.5 lb/MMSCF for Los Angeles and San Diego.

In addition to the corrosion problem, water in CNG could freeze or form hydrates during handling, especially during the desired fast-fill operations. The quantity of water in saturated natural gas at various pressures and temperatures can be estimated from correlations in the literature. Some of these correlations also show a hydrate-formation line indicating that solid hydrates will form when the pressure of natural gas of a specific moisture content is suddenly reduced. For instance, if gas of typical pipeline composition (0.6 gravity) at 2000 psig and 120° F. is expanded to 400 psig, hydrates will form if the gas contains more than 15 lbs. of water per MMSCF. At pressures below about 150 psia, on the other hand, cooling to 32° F. is necessary to precipitate a solid phase, when ordinary ice will form. The hydrates form more readily (i.e., at a higher temperature or lower pressure) with gases of greater density and less readily with very light gases. Thus, for example, at a pressure of 1,000 psia, hydrates form at about 62° F. in natural gas of about 0.60 specific gravity, while they form at about 67° and 71° F., respectively, in gases of 0.75 and 1.00 specific gravity. Thus, it may be expected that compressed natural gas at pressures ranging from about 3,000 to about 5,000 psig, would be highly susceptible to the formation of hydrates if the gas is saturated with water vapor or contains a significant amount of water vapor. Cooling of CNG owing to pressure reduction necessarily takes place during NGV fueling operations, particularly in the case of quick-fill systems.

It is known to remove water from gases by contacting the wet gas with a dehydrating solution that contains a substance that either absorbs or reacts with water. In this process, water vapor is transferred from the gas to the dehydrating solution and dried gas is obtained. Desirably, the dehydrating solution, now containing removed water as a liquid, is regenerated (i.e. dried) and recycled. The regeneration steps typically used include several stages of heating the dehydrating solution to drive off water as water vapor. The substantially water-free dehydrating solution is then recycled for contacting with wet gas.

Typically, the gas industry uses fairly complex gas dryers having very large capacities, ranging up to 75 MMSCFD. These gas dryers include a wet gas dehydrating solution contactor and a dehydrating solution regenerator. U.S. Pat. No. 3,105,748 shows a glycol regenerator utilizing a still column for distilling wet glycol and removing water vapor. It is claimed that the patented stripping section achieves a regenerated glycol purity of 99.95%. Glycol circulation rates vary from about 2 to about 5 gallons of glycol per pound of water to be removed. Thus, to remove 20 lbs. of water per MMSCFD, from about 40 to about 1010 gallons of glycol should be available for each MMSCFD throughput.

What is needed is a method and apparatus that will allow complete filling of a fuel tank with CNG under fast-fill conditions and under climatic conditions that do not allow rapid dissipation of heat or compression. Further, the method and apparatus should reduce or eliminate the problems of icing up and corrosion caused by the presence of water in natural gas.

SUMMARY OF THE INVENTION

The invention provides an apparatus and process that allows the complete filling of fuel tanks with compressed natural gas (CNG). The apparatus and process of the invention provide a unique method of cooling the compressed natural gas before charging the gas to a fuel tank thereby allowing the fuel tank to be filled completely. The refrigeration system does not require additional refrigeration equipment but utilizes thermodynamic effects of a unique natural gas compression system.

The invention also provides a compact, simple, and cost effective apparatus and process for the dehydration of natural gas and CNG that can be used at natural gas vehicle (NGV) and other CNG filling stations so that the dehydrated gas meets proposed requirements for use as a vehicular fuel (i.e., from about 0.45 to about 3.5 lbs/MMSCF).

The gas cooling aspect and the gas drying aspect of the invention are clearly related. As a gas is cooled, to allow complete fast fill in hot weather, it approaches its dew point and risk of water condensation is increased. Thus, risk of accelerated corrosion and icing up of equipment is increased.

First, with regard to the gas cooling for complete fast filling of fuel tanks aspect, as explained in the invention of the parent application, U.S. Ser. No. 08/094,495, hereby fully incorporated by reference, a CNG compressor may include a primary four-stage compressor having, for example, 5 cylinders or using 5 cylinders of a 6 cylinder compressor. This compressor charges gas, cooled in interstage coolers, to a large storage tank. The pressure in the storage tank is maintained between a maximum of 4600 psig and a minimum of about 1000 psig. When the lower pressure is reached, the primary compressor is activated and refills the storage tank by compressing natural gas into it from a pipeline supply source.

Independent of the primary multi-stage compressor, the invention also supplies a single-stage evacuator compressor or an evacuator cylinder that is used to fill fuel tanks, as needed. Typically, this single-stage compressor can be an independently powered machine (as explained in our copending application U.S. Ser. No. 08/094,494, now U.S. Pat. No. 5,370,159, hereby fully incorporated by reference) or a sixth cylinder of a six cylinder compressor wherein the other five cylinders comprise the primary compressor.

Incomplete filling of the fuel tank has two causes. One is the compression heat as described above. The other is that conventional CNG stations typically use one compressor which maintains pressure in a relatively large storage tank from which vehicle fuel tanks and other fuel tanks are filled. If pressure in the large storage tank falls below the final pressure of the fuel tank, the fuel tank will not be filled to capacity. It takes time to pressure up a large storage tank resulting in either inconvenience (the vehicle has to wait for a long time for filling to be achieved) or vehicle tanks are not filled completely.

The use of the single stage evacuator cylinder or compressor overcomes the problem of incomplete filling of fuel tanks. Since the discharge pressure of this compressor or evacuator cylinder is higher than the vehicle tank pressure, CNG always expands across a fill valve and related piping before entry into the fuel tank. Thus, rather than heating the fuel tank, the expansion of the CNG cools the fuel tank and allows complete filling.

The cooling effect on the fuel tank is further enhanced because according to the invention, the natural gas drawn from the storage tank is also cooled to well below ambient temperature. The cooling of the gas in the storage tank is caused by two factors. Firstly, during the initial filling cycle of a fuel tank, the fuel tank is supplied directly from the storage tank. The storage tank, being at higher pressure, releases gas which flows to the lower pressure fuel tank. While this transfer of gas is taking place, the pressure in the storage tank declines and gas in the storage tank expands. This expansion causes cooling of the storage tank. When pressure between the storage tank and the fuel tank has equilibrated, so that no further gas flows, the evacuator cylinder is brought into service to complete the filling of the fuel tank. As explained above, since the discharge pressure from the evacuator cylinder is higher than the pressure of the fuel tank, the gas is expanded across a fill valve, resulting in a decrease in temperature.

The other factor providing cooling of the storage tank is a refrigeration effect of the invention caused by the idling single-stage evacuator cylinder or compressor. When the single-stage compressor is in an idling mode, it removes gas from the storage sphere, compresses the gas, cools the gas in a downstream cooler, and then expands the cooled gas across a control valve back into the storage sphere. This continuous expansion of cooled gas into the storage sphere causes significant further cooling of the gas in the storage sphere. Thus, the storage sphere gas is refrigerated when the single-stage compressor "idles".

With regard to the gas drying aspect of the invention, in particular, the present invention provides an apparatus, including a means for contacting wet natural gas with a cooled dehydrating fluid to absorb water from the natural gas into the fluid. The cooled dried natural gas, with a substantially reduced dew point temperature, then flows through a demister, where entrained dehydrating fluid is removed, and the gas is then available for compression or storage for subsequent use as NGV fuel. A portion of spent, water-containing, dehydrating fluid is continuously or intermittently removed from the means for contacting and flows to a means for regeneration of the dehydrating fluid. In the regeneration step, heat is applied to the dehydrating fluid to drive off substantially all moisture in the form of water vapor. The dehydrating fluid, now substantially free of moisture, is then pumped to a means for cooling to about 30° F. above ambient temperature. The cooled fluid is then recycled by pumping back to the means for contacting.

According to the invention, the gas drying and cooling; and dehydrating fluid regeneration, cooling, and recirculation systems, form a closed loop. Dehydrating fluid losses amount to from about 0.05 to about 0.3 gallons per MMSCF of gas treated. Make up fluid is added to the loop to maintain the desired dehydrating fluid: wet gas ratio. Further, the apparatus according to the invention requires circulation of from about 2 to about 5 gallons of dehydrating fluid per pound of water to be removed from the natural gas. Preferably, the dehydrating fluid is a glycol, more preferably, ethylene, diethylene, or trimethylene glycol.

In contrast to the prior art, showing several stages of heating of glycol in order to remove moisture, the present invention is operative with only a single stage of heating and achieves water removal from the glycol to a residual level of less than about 0.1 mass percent. Further, in contrast to the prior art, the process of the invention cools the dehydrating fluid after it has been regenerated to improve water removal (absorption) in the gas-liquid contactor. This permits the dew point temperature of the dried gas to be further reduced, a feature that is particularly useful in proposed CNG filling systems that cool the CNG when it is compressed into a receiving tank, such as NGV's fuel tank. The cooling of the dehydrating fluid may be obtained by heat exchange with CNG cooling, across a pressure reduction device, such as a pressure reduction valve.

The apparatus and process of the invention allow the complete filling of fuel tanks so that natural gas vehicles and other users of CNG may have the full benefit of the storage capacity of their fuel tanks. Further, the apparatus and process of the invention reduce or eliminate the problems of water-induced corrosion and icing up of equipment.

BRIEF DESCRIPTION OF THE DRAWINGS

A better understanding of the present invention can be obtained when the following detailed description of the preferred embodiments is considered in conjunction with the following drawings, in which.

DETAILED DESCRIPTION OF THE PREFERRED EMBODIMENTS

Figure 1A:
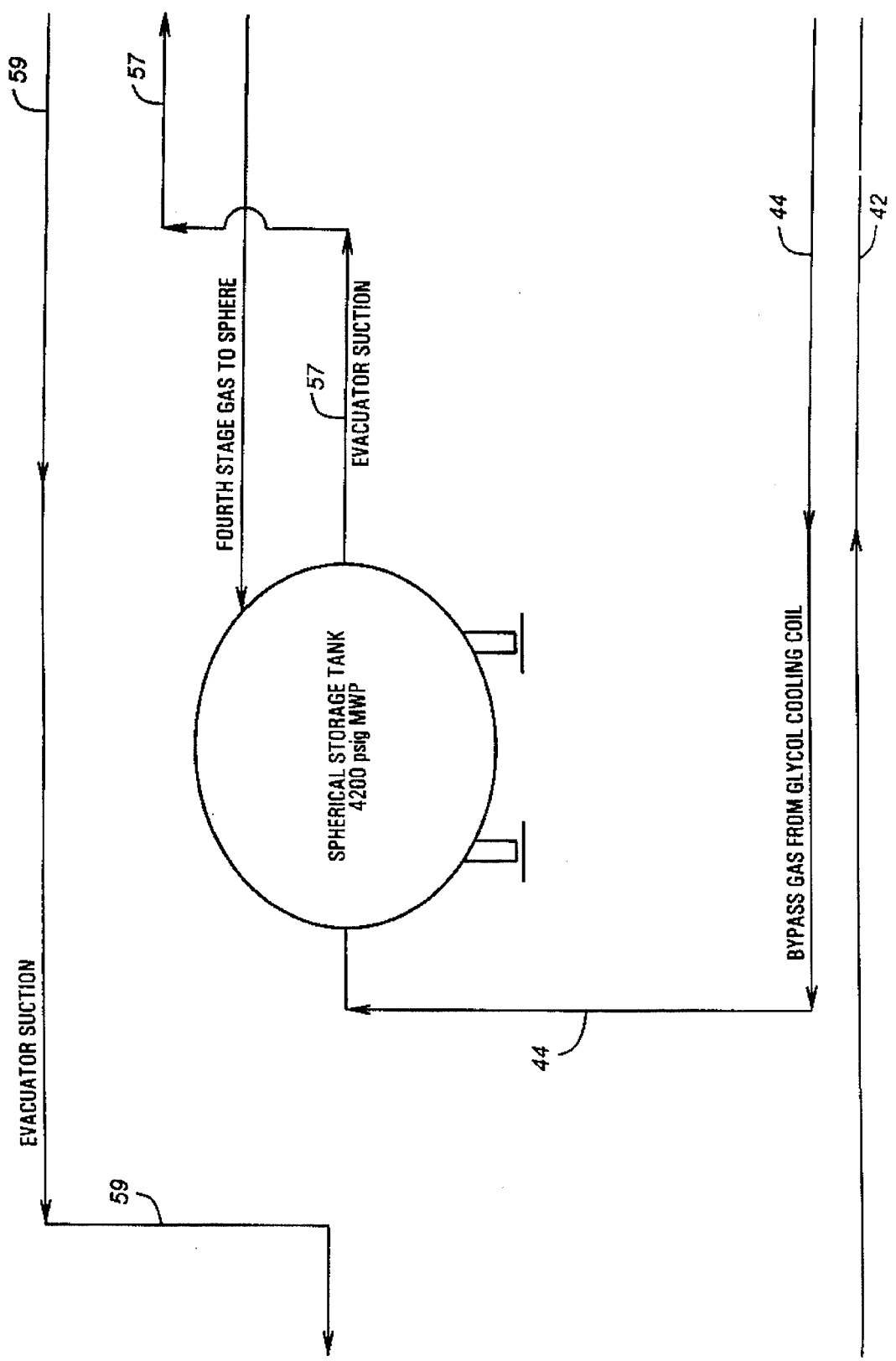
FIGS. 1A–D are a schematic process flow diagram showing major equipment and the process steps for an embodiment of the invention.
Figure 1B:
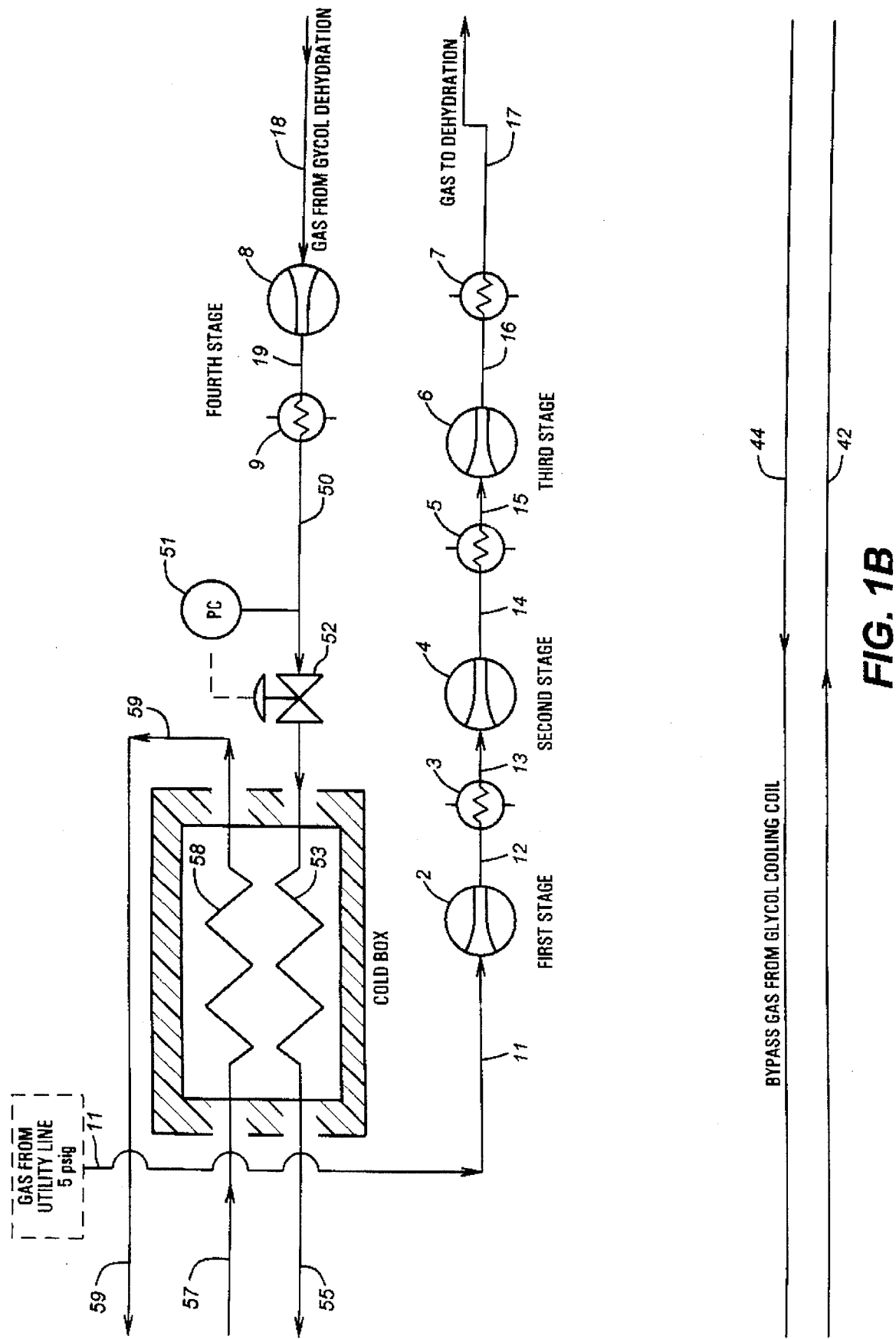
Figure 1C:
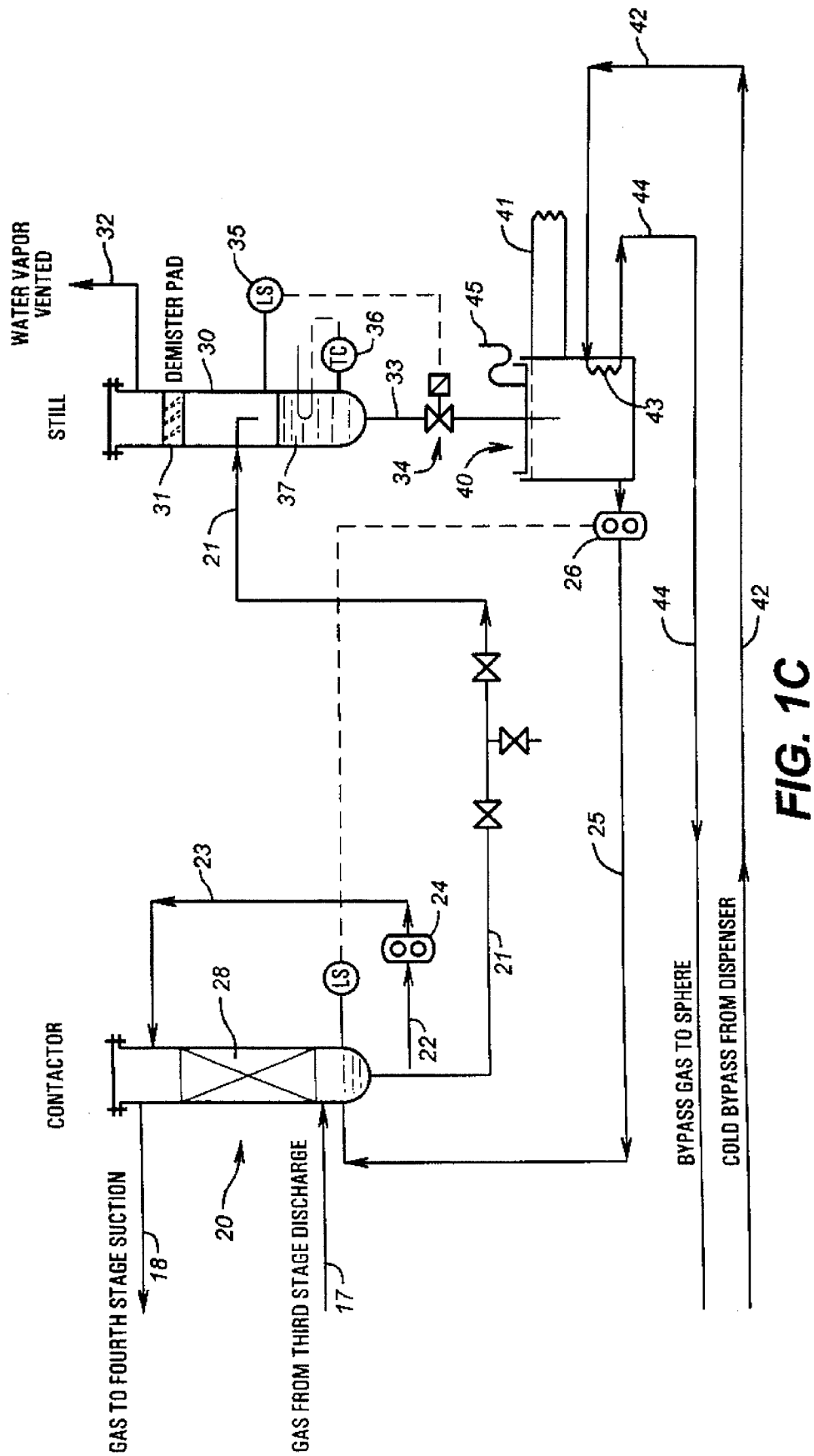
Figure 1D:
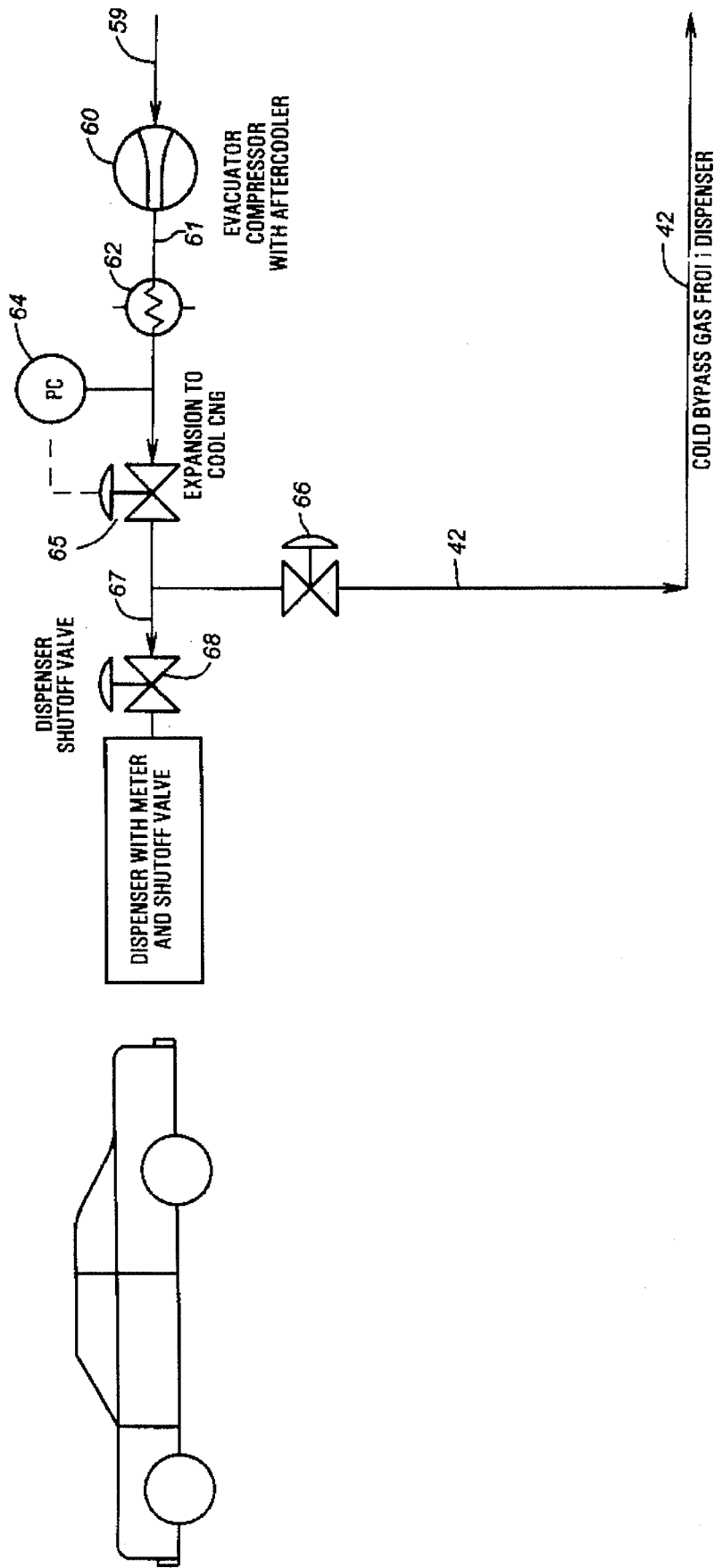

The invention rapid fueling system for supplying natural gas to fleets of vehicles may be better understood with reference to FIG. 1A–1D, which is exemplary of the invention. From FIG. 1B, natural gas is supplied at relatively low pressure (about 5 psi) through conduit 11 to the suction of the first stage 2 of a compressor. The pressure of the supplied natural gas is increased by compression through the first stage 2 of the compressor up to about 45 psi into the first stage discharge line 12 and hence into the first interstage cooler 3 where the compressed, heated gas is cooled. Cooled gas flows through conduit 13 into the suction of the second stage 4 of the multi-stage compressor. The second stage 4 compresses the natural gas further to about 250 psi and discharges this compressed gas into conduit 14 and hence to second stage intercooler 5 where the compressed, heated gas is cooled before entering conduit 15, the suction line to the third stage 6 of the compressor. Third stage 6 further compresses the natural gas to about 1,000 psi and discharges this compressed gas into conduit 16. Conduit 16 carries the gas to third stage intercooler 7 where it is cooled and discharged into line 17. Line 17 carries the cooled compressed gas to a contactor 20 for removing moisture from the gas. The contactor contains a section 28 that is filled with a means for providing intimate contact between the gas and a liquid capable of absorbing moisture, such as a glycol. The means for contacting include conventional means such as column packing or trays. Gas entering the column 20 rises through the contacting section 28 and exits in conduit 18 after moisture has been removed through counter-current contact with glycol that enters column 20 at its top end via conduit 23. The glycol flows downward through the column and collects at its base from where it may be recirculated to the top of the column 20 via conduit 22 and pump 24. A proportion of the glycol, now containing moisture, is removed from the recirculation circuit through conduit 21 and is routed to a still 30, where moisture is stripped from the glycol. The removed moist glycol is replaced with dehydrated glycol through conduit 25. This prevents the build up of moisture in the glycol that is used to strip moisture from the compressed gas.

The moisture-containing glycol removed from the contactor is dehydrated in the still 30 by the application of heat. As shown, the still 30 is equipped with heating coils 37, the temperature of which are controlled by temperature controller 36. Thus, the glycol is heated to the point that moisture is driven off as a vapor, traveling upwards in still 30 through demister pad 31, for removal of entrained glycol, and exits the still 30 through conduit 32, to the atmosphere. Heated, dehydrated glycol is removed from the bottom of the still 30 through conduit 33 and flows to glycol storage drum 40. The controlled removal of glycol from the base of the still 30 is readily accomplished under level control utilizing a level sensor 35 that controls a control valve 34 on conduit 33. Thus, as the glycol level in the base of still 30 increases, the level sensor 35 sends a signal to control valve 34 which opens to allow glycol to flow to drum 40. When the level drops below a predetermined level, the sensor 35 sends a signal to valve 34 which then closes to decrease or shut off flow of glycol to drum 40. In this manner, a level of glycol is maintained in the base of still 30 while being heated by heating coils 37.

The glycol in storage drum 40 is cooled by circulating a portion of the glycol through external coils or heat exchanger 41. Also, heat is removed through coils 43, through which cold gas flows. Cooled glycol is then periodically removed by pumping through pump 26 and conduit 25 to contactor 20 under level control, to make up for moist glycol removed through conduit 21. The level control is effected by level sensor 27 which senses the level of glycol in the base of contactor 20 and which controls pump 26. Thus, as the level of glycol in contactor 20 declines, sensor 27 initiates pumping through pump 26. As the glycol level increases in contactor 20 above a predetermined level, sensor 27 turns off pump 26.

Now that the compressed gas has been dehydrated and cooled through contact with cold glycol, the gas flows through conduit 18 to the fourth stage 8 of the compressor. Here the gas is compressed up to 4600 psi and the hot compressed gas exits through conduit 19 to after-cooler 9 where the gas is cooled to near ambient temperature. Cooled gas then flows through conduit 50 through back pressure controller 51 that controls pressure on conduit 50 by operating valve 52. When the pressure in conduit 50 exceeds a predetermined level, pressure controller 51 opens valve 52 to allow compressed gas to expand across the valve and flow into cold box 54. Thus, cold compressed gas flows through coils 53 in cold box 54 and then exits from cold box 54 and flows to storage tank 56 through conduit 55. In this manner, stored gas is obtained that is both dehydrated, having a dewpoint of less than about 20° F., and cold due to expansion across valve 52.

According to the invention, in those circumstances when gas is not being demanded from storage by a customer, gas is circulated through an evacuator compressor or an evacuator cylinder that is separate from the other cylinders of the primary compressor, but mounted on a common shaft. As illustrated, for purposes of ease of explanation, a separate evacuator compressor is shown. However, the evacuator cylinder of the primary compressor disclosed in our parent application U.S. Ser. No. 08/094,495, now U.S. Pat. No. 5,370,159, fully incorporated by reference, may also be utilized. Thus, during an idle phase when no gas is demanded, gas is withdrawn from the storage tank 56 through conduit 57 and flows through cold box 54, containing coils 58 and exchanges heat with gas expanded across valve 52 so that it is cooled and exits through conduit 59 to the evacuator compressor 60. This compressor compresses the gas up to about 3000 psig and the now compression-heated compressed gas exits through line 61 into after cooler 62. After being cooled in cooler 62, the gas enters conduit 63 and, when sufficient pressure is developed above a predetermined set point such as 3000 psig, pressure controller 64 opens control valve 65 so that gas expands across the valve 65 and is cooled so that gas flows into line 42, to glycol storage drum 40 where it enters coils 43 for cooling stored glycol then exits into conduit 44 for recirculating back to the CNG storage tank 56. On a net basis, the gas re-entering the storage tank 56 is colder than the gas withdrawn through conduit 57. Thus, in carrying out this "idling operation" using the evacuator compressor 60, the storage tank 56 is gradually cooled as heat is extracted.

When gas is demanded for sale, as for instance by an NGV, the gas may be fast-filled to the consumer through the evacuator compressor. In this instance, control valve 66 closes so that gas exiting from evacuator compressor 60 flows through conduit 67, through dispenser control valve 68, into the fuel tank to be filled. During this process, gas flowing through control valve 68 undergoes a pressure drop and therefore expands and cools. As a consequence, cold gas exiting from cooler 62 is further cooled by expansion through valves 65 and 68 so that cold gas enters the fuel tank. As pressure in the fuel tank increases, the pressure drops across valves 65 and 68 decreases so that this aspect of the cooling effect is reduced. However, the gas exiting from intercooler 63 is precooled. Thus, the invention provides for the flow of a cooler gas to a fuel tank than in prior art systems so that the fuel tank may be completely filled to its rated capacity with CNG. Further, since moisture has been removed from the gas by counter-current contact with ethylene glycol, problems associated with moisture in the gas, such as icing up and corrosion, are effectively eliminated or considerably reduced.

Although the invention has been described with reference to its preferred embodiments, those of ordinary skill in the art may, upon reading this disclosure, appreciate changes and modifications which may be made and which do not depart from the scope and spirit of the invention as described above and claimed below.

What is claimed is:

1. A method for complete fast-filling a fuel receiving tank with compressed natural gas, the method comprising:
   (a) cooling a storage tank containing compressed natural gas by a method comprising:
      removing a portion of the compressed natural gas from the storage tank, further compressing the removed portion of gas, cooling the removed portion of further compressed natural gas, expanding the cooled further compressed removed portion of natural gas so that it is further cooled, and returning the further cooled removed portion of gas to the storage tank;
   (b) compressing a second portion of gas from the storage tank to a pressure above a required pressure in a fuel receiving tank;
   (c) expanding the compressed second portion of gas to at most the required pressure; and
   (d) substantially filling a fuel tank with the gas.

2. The method of claim 1, wherein the compressing step (b) is by a second independent compressor of lower horsepower than a first compressor used in the cooling step (a).

3. The method of claim 1, wherein the compressing step (b) is by means of a cylinder of a compressor used in cooling step (a).

4. The method of claim 1 further comprising compressing incoming natural gas and cooling said incoming gas after compression and then charging said gas into the storage tank.

5. The method of claim 4, wherein the cooling of the incoming gas comprises expansion across a means for reducing pressure on the gas.

6. The method of claim 1 further comprising drying gas before the expanding of step (c).

7. The method of claim 6, wherein the drying comprises contacting the gas with a dehydrating agent to remove moisture from the gas.

8. The method of claim 7, wherein the contacting comprises counter-current contacting with a liquid dehydrating agent.

9. The method of claim 8, wherein the liquid dehydrating agent comprises a glycol.

10. The method of claim 7 further comprising regenerating and recycling the liquid dehydrating agent.

11. The method of claim 10, wherein the step of regenerating comprises heating the dehydrating agent to drive off moisture.

12. The method of claim 11, wherein the recycling comprises cooling the dehydrating agent after the heating step and reusing cooled dehydrating agent to contact natural gas to remove moisture from the gas.

13. An apparatus for cooling and drying natural gas to allow complete filling of a fuel receiving tank with compressed natural gas, the apparatus comprising:
   (a) a compressed natural gas storage tank;
   (b) first means, in fluid communication with the storage tank, for compressing gas from a source of natural gas into the storage tank;
   (c) second means for withdrawing a portion of gas from the storage tank and compressing the portion to a pressure above a predetermined gas pressure of the storage tank;
   (d) means for reducing pressure on a gas, said means located on a conduit from a compression exit of the second means for compressing;

(e) a conduit, downstream of the means for reducing pressure, for conducting reduced pressure gas from the means for reducing pressure to the storage tank;

(f) conduit means for controlledly delivering gas from the storage tank to a fuel receiving tank, the means comprising a second pressure reducing means for reducing pressure on gas removed from the storage tank and thereby cooling the gas;

(g) means, in fluid communication with and upstream of the gas storage tank, for drying incoming gas, the means comprising:

(i) a means for contacting wet natural gas with a dehydrator liquid for removing water from the wet gas, the means for contacting comprising an inlet for wet gas at a lower portion thereof, an exit for substantially dried gas at an upper portion thereof, and means intermediate the inlet and exit for intimately contacting wet gas with dehydrator liquid;

(ii) means, located intermediate the exit for substantially dry gas and the means for intimately contacting, for removing entrained dehydrator liquid from gas exiting from said means for contacting;

(iii) conduit means for conveying dehydrator liquid from a lower portion of said means for contacting to a means for regenerating dehydrator liquid, said means for regenerating comprising:

a regenerating vessel containing a means for heating dehydrator liquid to drive moisture from said liquid; a first exit pipe located at an upper end of said vessel for withdrawing moisture driven from the dehydrator liquid; and a second exit conduit for removing regenerated dehydrator liquid and supplying said liquid to a means for cooling;

(iv) means for cooling the regenerated dehydrator liquid to a temperature below about 35° C., said means for cooling the regenerated dehydrator liquid in fluid communication with the exit pipe of the regenerator; and (v) pumping means for receiving cooled regenerated dehydrator liquid and pressurizing the cooled liquid to the means for contacting wet gas with dehydrator liquid, said pumping means in fluid communication with the means for cooling.

14. The apparatus of claim 13 wherein the means for reducing pressure on a gas is a control valve.

15. The apparatus of claim 13 wherein the means for contacting wet natural gas with a dehydrator liquid comprises tower packing having a high surface area to volume ratio, said packing being installed in the means for contacting wet gas with dehydrator liquid so that gas flows over the packing and is contacted with dehydrator liquid flowing countercurrently over the packing.

16. The apparatus of claim 13 wherein the means for drying incoming gas is able to dry gas to a moisture content of less than about 3.5 lb/MMSCF.

17. A method for complete fast-filling a fuel receiving tank with compressed natural gas, the method comprising:

(a) compressing natural gas in its gas phase from a source to a storage tank;

(b) further compressing a portion of gas from the storage tank to a pressure above a required pressure in a fuel receiving tank;

(c) cooling the compressed portion of gas;

(d) expanding the cooled compressed portion of gas to at most the required pressure to further cool the portion of gas; and (e) substantially filling a fuel tank with the gas.

18. The method of claim 17, wherein the further compressing step (b) is by a second independent compressor of lower horsepower than a first compressor used in step (a).

19. The method of claim 17, wherein the further compressing step (b) is by means of a cylinder of a compressor used in step (a).

20. An apparatus for cooling natural gas to allow complete fueling of a fuel receiving tank with compressed natural gas, the apparatus comprising:

(a) a compressed natural gas storage tank;

(b) first means, in fluid communication with the storage tank, for compressing gas from a source of natural gas in its gas phase into the storage tank;

(c) second means for withdrawing a portion of gas from the storage tank and compressing the portion to a pressure above a predetermined gas pressure of the storage tank;

(d) a cooler means, in fluid communication with the second means, for cooling the compressed portion of gas; and (e) a pressure reducing means, in fluid communication with the cooler means, for reducing pressure on the cooled compressed portion of gas for further cooling the gas to substantially fill a fuel tank with the gas.

21. The apparatus of claim 20, wherein the compressing of the second means is by a second independent compressor of lower horsepower than a first compressor used in the compressing of the first means.

22. The apparatus of claim 20, wherein the compressing of the second means is by means of a cylinder of a compressor used in the compressing of the first means.

23. An apparatus for cooling natural gas to allow complete filling of a fuel receiving tank with compressed natural gas, the apparatus comprising:

(a) a compressed natural gas storage tank;

(b) first means, in fluid communication with the storage tank, for compressing gas from a source of natural gas into the storage tank;

(c) second means for withdrawing a portion of gas from the storage tank and compressing the portion to a pressure above a predetermined gas pressure of the storage tank;

(d) means for reducing pressure on a gas, said means located on a conduit from a compression exit of the second means for compressing;

(e) a conduit, downstream of the means for reducing pressure, for conducting reduced pressure gas from the means for reducing pressure to the storage tank; and (f) conduit means for controlledly delivering gas from the storage tank to a fuel receiving tank, the means comprising a second pressure reducing means for reducing pressure on gas removed from the storage tank and thereby cooling the gas.

24. The apparatus of claim 23, wherein the compressing of the second means is by a second independent compressor of lower horsepower than a first compressor used in the compressing of the first means.

25. The apparatus of claim 23, wherein the compressing of the second means is by means of a cylinder of a compressor used in the compressing of the first means.

* * * * *